Patented Feb. 3, 1925.

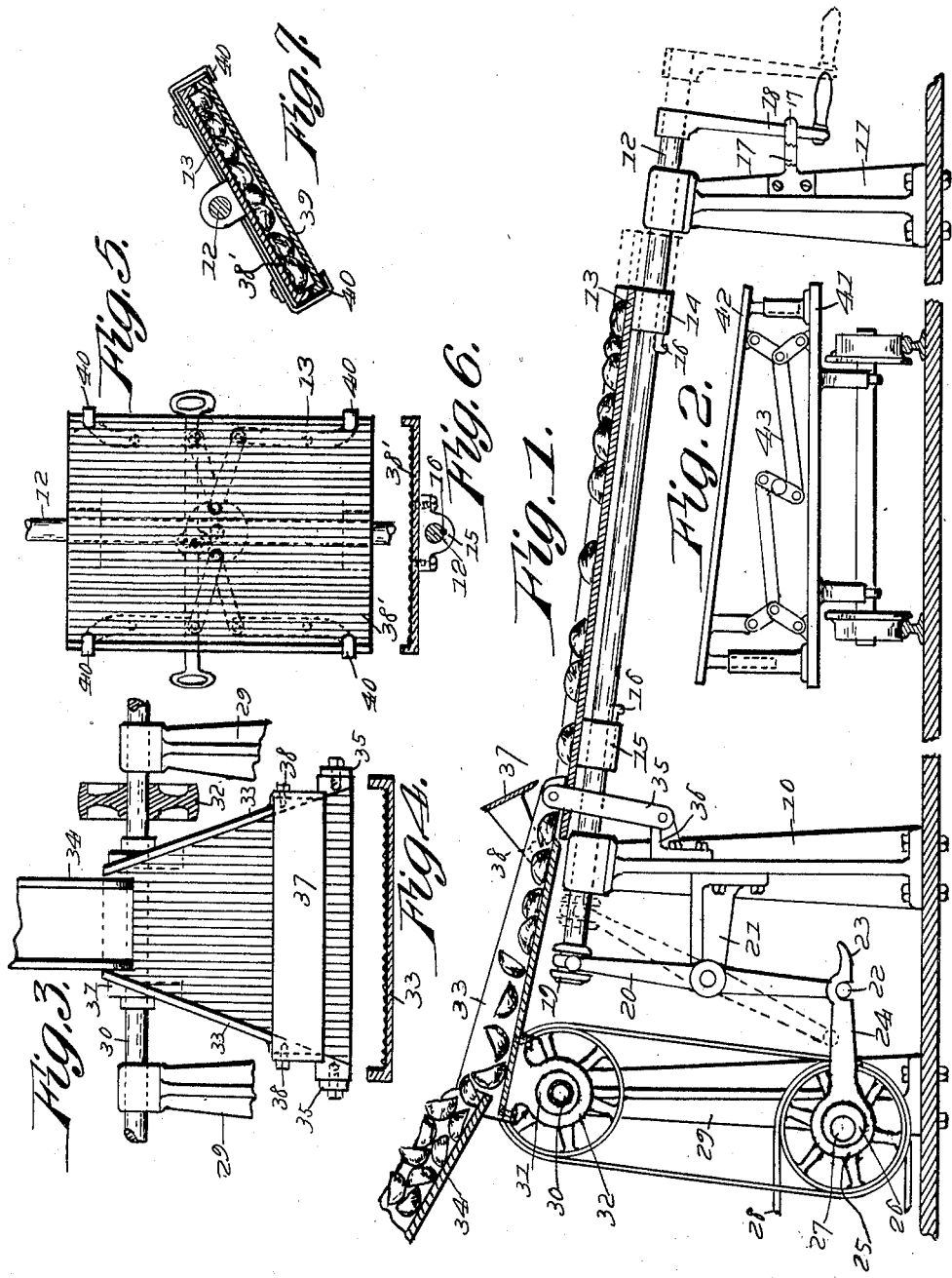

1,525,412

UNITED STATES PATENT OFFICE.

GEORGE R. PARANTEAU, OF VENTURA, CALIFORNIA.

FRUIT-SPREADING DEVICE.

Application filed March 16, 1921. Serial No. 452,870.

*To all whom it may concern:*

Be it known that I, GEORGE R. PARANTEAU, a citizen of the United States of America, and resident of Ventura, in the county of Ventura and State of California, have invented certain new and useful Improvements in Fruit-Spreading Devices, of which the following is a specification.

This invention relates to fruit transferring apparatus intended for use in connection with drying fruit and it has for its object the provision of novel means for delivering fruit to trays uniformly and in certain position, as will presently appear, the said invention also including novel means whereby the fruit is transferred from the receiving to drying trays which may be transported to positions for subjecting fruit to the action of the drying agency.

A still further object of this invention is to produce fruit agitating and receiving devices which will cause the fruit to be received primarily with the cut side downward in order that it may be transferred to a drying tray with the cut side exposed for the purpose of insuring uniform treatment of the contents of the tray.

A still further object of this invention is to produce a fruit transferring machine having a course over which the fruit travels in which the bottom of the course is corrugated to obviate suction which would result were the hollow halves of fruit delivered with the cut side down on the bottom of the course, the said corrugated bottom permitting the circulation of air which will prevent the formation of an air seal under the fruit.

A still further object of this invention is to provide a machine having vibrating movement effective to agitate the halves or portions of cut fruit so that the outer or rounded sides thereof will cause the fruit to move until it is deposited on the bottom of the course with the flat side down in which position the fruit will be transferred to the tray or receptacle from which it is transferred to the drying tray and the said invention furthermore contemplates the provision of novel means for effecting the transfer of fruit from the tray of the machine to the drying trays and for interrupting the passage of fruit to the tray of the machine while the transfer is being effected.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view, parts being in elevation, of a machine embodying the invention;

Figure 2 illustrates a view in elevation of the drying tray and its supporting means;

Figure 3 illustrates a plan view of a fragment of a machine;

Figure 4 illustrates a sectional view thereof;

Figure 5 illustrates a plan view of the receiving tray;

Figure 6 illustrates a transverse sectional view thereof; and

Figure 7 illustrates a sectional view of the receiving tray and drying tray in assembled relation for transferring fruit from one to the other.

In these drawings 10 and 11 denote standards having bearings at their upper ends in which a shaft 12 is slidably and rotatably mounted. What is termed the receiving tray 13 is a tray to which the fruit is delivered in position to be transferred to a drying tray, and the said receiving tray has hollow bosses 14 and 15 on its bottom through which the shaft 12 extends and these bosses are secured to the shaft by key 16 in order that the receiving tray will be carried by the shaft, as will presently appear. The standard 11 has fingers or detents 17 extending from it which engage a crank handle 18 on the shaft, and by means of the said crank handle the shaft may be rotated to turn the receiving tray up-side-down under the shaft for delivering the fruit which has been deposited on it to the drying tray. The full line positions of the shaft and crank handle in Fig. 1 illustrate the position in which the parts remain while fruit is being deposited on the receiving tray, whereas the dotted line positions of these parts illustrate the adjustment of which these parts are capable when the shaft is to be turned for depositing the fruit on the drier.

The device is in the nature of a fruit spreading device in that the fruit after it is cut and pitted is spread on the receiving tray of the machine in proper position to be transferred to the drying tray. The receiving tray is so connected to the shaft 12 as to move with the shaft. The end of the shaft 12 remote from the crank handle has a collar or annular groove 19 which is engaged by a bifurcated end of a lever 20 which lever is pivoted to the bracket 21 supported by the standard and the opposite end of the lever has a transversely disposed lug 22 engaged by the hook end 23 of an eccentric arm 24 which eccentric arm has an eccentric strap 25 operating over the eccentric 26 on the shaft 27. The shaft is driven from any suitable source of power through the medium of a belt 28, the details of which are not material.

A standard 29 has a shaft 30 journaled in it and this shaft has an eccentric 31 on it engaging an eccentric strap 32. The eccentric strap constitutes a support for one end of a vibrating table 33 to which fruit is delivered from a chute 34, the fruit being shown as being halved and pitted. The vibrating table is supported at its opposite end by a pivoted link 35 connected to a bracket 36 of the standard 10 and thus the vibrating table has a movement longitudinally and vertically which is effective to move the fruit from one of its ends to the other, while at the same time agitating the fruit in order that the rounded sides thereof may roll or oscillate on the receiving tray until the agitation results in causing the fruit to lie with its flat side on the receiving table, after which the movement of the table causes the fruit to descend and escape at the lower end thereof, and as shown, the receiving tray is in such juxta-position to the table that the fruit is delivered from the table to the receiving tray. It will be seen from an inspection of the drawing and the arrangement of parts that the reciprocation of the receiving tray is timed to correspond with the movement of the table, so that these parts, notwithstanding they are moving, are maintained in such operative relation as to cause the transfer of fruit from one to the other.

At such times as the fruit is being transferred from the receiving tray to the drying tray, the escape of fruit from the table to the receiving tray is interrupted by means of a gate 37, the sides of which are oscillatably mounted on the pivots 38 extending into the sides of the vibrating table and the operator may lower or lift the gate, according to requirements. The receiving tray has a corrugated bottom 38' which is intended to obviate the formations of vacuums or suction which would prevent dislodgment of the halves of the fruit from the receiving tray when the same is to be transferred to the drying tray and when such transfer is being made, the parts will be moved to the dotted line positions of Fig. 1. The drying tray 39 will be placed over the receiving tray and secured thereto by clamps such as 40 which embrace the edges of the trays and hold them in assembled relation to each other while the shaft is being turned to invert the receiving tray and cause the gravitation of the fruit to the receiving tray. The receiving tray will then be deposited on a car 41 having a platform 42 for the support of the drying tray, the said platform having means generally shown by the mechanism 43 for raising or lowering the platform in order that the said platform may be elevated into position to receive the drying tray after the receiving tray has been inverted, it being understood that when the drying tray has been so deposited, the clamp will be removed and the operation of the machine will be resumed and repeated.

In operation, the tray 13 being keyed to the shaft 12, the said tray will move with the shaft when it slides axially. Motion is imparted to the shaft through the lever 20 while the tray is being filled with fruit. When the tray is full, the lever is unlocked from the eccentric and the shaft is allowed to move outwardly, thus carrying the tray to the position shown in dotted lines. A filling tray is then placed over the receiving tray and clamped in position and the combined trays are then turned so that the receiving tray is bottomside up. The rotary movement to accomplish this result is imparted to the shaft by the handle 18. The swivel joint 19 where the lever 20 connects to the shaft allows for the movement described. After the fruit has been transferred, the receiving tray is returned to its normal position and the shaft is hooked with the eccentric and the operation is repeated.

I claim:

1. In a fruit spreading machine, a receiving tray having a corrugated bottom, a shaft to which the receiving tray is secured, bearings in which the shaft has rotary and longitudinal movement, means for rotating the shaft, a drying tray, and means for clamping the drying tray to the receiving tray while the said receiving tray is inverted.

2. In a fruit spreading machine, a receiving tray, a shaft to which the receiving tray is secured, bearings in which the shaft has rotary and longitudinal movement, means for rotating the shaft, a drying tray, and means for clamping the drying tray to the receiving tray for movement therewith.

3. In a fruit spreading device, a receiving tray, a shaft to which the tray is connected for movement therewith, a vibratory table mounted to discharge to the receiving tray and means for vibrating the table and moving the shaft axially simultaneously.

4. In a fruit spreading device, a receiving tray having a corrugated bottom, a shaft rotatably mounted and axially movable to which the said receiving tray is attached for movement therewith, a vibratory table, means for mounting the vibratory table for movement and in operative relation to the receiving tray for delivering fruit thereto, and means for moving the shaft axially and for operating the vibratory table simultaneously.

5. In a fruit spreading device, a receiving tray having a corrugated bottom, a shaft to which the receiving tray is attached, means for mounting the shaft for rotary and longitudinal movement, a vibratory table mounted in operative relation to the receiving tray for delivering fruit thereto, a drying tray, means for clamping the drying tray to the receiving tray, and a gate for interrupting communication between the vibratory table and the receiving tray.

6. In a fruit spreading device, a receiving tray having a corrugated bottom, a shaft to which the receiving tray is attached, means for mounting the shaft for rotary and longitudinal movement, a vibratory table mounted in operative relation to the receiving tray for delivering fruit thereto, a drying tray, means for clamping the drying tray to the receiving tray, a gate for interrupting communication between the vibratory table and the receiving tray, and means for delivering fruit to the vibratory table.

GEORGE R. PARANTEAU.